United States Patent
Russell

(10) Patent No.: US 9,328,436 B2
(45) Date of Patent: May 3, 2016

(54) ENERGY ABSORBING FABRIC AND METHOD OF MANUFACTURING SAME

(71) Applicant: YKK CORPORATION OF AMERICA, Marietta, GA (US)

(72) Inventor: Timothy M. Russell, Anniston, AL (US)

(73) Assignee: YKK Corporation of America, Marietta, GA (US)

( * ) Notice: Subject to any disclaimer, the term of this patent is extended or adjusted under 35 U.S.C. 154(b) by 465 days.

(21) Appl. No.: 13/828,367

(22) Filed: Mar. 14, 2013

(65) Prior Publication Data

US 2014/0273697 A1    Sep. 18, 2014

(51) Int. Cl.

| | |
|---|---|
| D03D 1/00 | (2006.01) |
| A62B 35/04 | (2006.01) |
| D03D 41/00 | (2006.01) |
| D06C 7/00 | (2006.01) |
| B64D 25/06 | (2006.01) |
| D03D 11/00 | (2006.01) |
| D03D 15/04 | (2006.01) |

(Continued)

(52) U.S. Cl.
CPC .......... *D03D 1/0094* (2013.01); *A62B 35/0093* (2013.01); *A62B 35/04* (2013.01); *B64D 17/30* (2013.01); *B64D 25/06* (2013.01); *D03D 1/0005* (2013.01); *D03D 11/00* (2013.01); *D03D 15/04* (2013.01); *D03D 15/08* (2013.01); *D03D 41/00* (2013.01); *D06C 7/00* (2013.01); *B60R 22/16* (2013.01); *D10B 2401/061* (2013.01); *D10B 2505/122* (2013.01); *Y10T 442/3203* (2015.04); *Y10T 442/3211* (2015.04)

(58) Field of Classification Search
CPC ...... B64D 17/30; B64D 17/32; D03D 1/0005; D03D 15/08; D03D 17/00; D03D 1/0094; D10B 2505/122; D10B 2401/061; Y10T 442/3203; Y10T 442/3211
USPC ...................... 442/206, 207; 280/801.1–808; 139/408–415
See application file for complete search history.

(56) References Cited

U.S. PATENT DOCUMENTS

| | | | |
|---|---|---|---|
| 2,681,667 | A | 6/1954 | Slaughter |
| 3,444,957 | A | 5/1969 | Ervin, Jr. |

(Continued)

FOREIGN PATENT DOCUMENTS

| | | |
|---|---|---|
| CN | 86104250 | 2/1997 |
| EP | 0034458 A1 | 8/1981 |

(Continued)

OTHER PUBLICATIONS

Chinese Application No. 201180033002.5 First Office Action mailed Jul. 10, 2014, 14 pages (English translation provided).

(Continued)

*Primary Examiner* — Jenna Johnson
(74) *Attorney, Agent, or Firm* — Kilpatrick Townsend & Stockton LLP

(57) ABSTRACT

Energy absorbing fabrics that are generally flat and that have a controllable and significant elongation distance. The fabrics are comprised of elongation yarns, such as partially oriented yarns (POY), and binder yarns, where the elongation yarns and the binder yarns have various weave-in percentages depending on the desired amount of elongation. In certain embodiments, because they are generally flat, the energy absorbing fabrics are suitable for use in retractors. Also provided are processes of manufacturing generally flat, energy absorbing fabrics.

20 Claims, 8 Drawing Sheets

(51) Int. Cl.
*D03D 15/08* (2006.01)
*B64D 17/30* (2006.01)
*A62B 35/00* (2006.01)
*B60R 22/16* (2006.01)

(56) References Cited

U.S. PATENT DOCUMENTS

| | | | |
|---|---|---|---|
| 3,530,904 A * | 9/1970 | Ballard | 139/383 R |
| 3,550,956 A | 12/1970 | Lowe | |
| 3,550,957 A | 12/1970 | Radke et al. | |
| 3,756,288 A | 9/1973 | Seo et al. | |
| 3,804,698 A | 4/1974 | Kinloch | |
| 3,857,023 A | 12/1974 | McCall | |
| 3,861,744 A | 1/1975 | Yamada et al. | |
| 3,871,816 A | 3/1975 | Strong | |
| 3,872,895 A | 3/1975 | Takada | |
| 3,919,018 A | 11/1975 | Schroeder | |
| 3,926,227 A | 12/1975 | Takada et al. | |
| 3,978,894 A | 9/1976 | Boone | |
| 3,997,190 A | 12/1976 | Seiffert et al. | |
| 4,004,616 A | 1/1977 | Andronov et al. | |
| 4,005,569 A | 2/1977 | Corbiere | |
| 4,138,157 A | 2/1979 | Pickett et al. | |
| 4,177,839 A | 12/1979 | Kikuchi | |
| 4,209,044 A | 6/1980 | Taki | |
| 4,228,829 A | 10/1980 | Kikuchi | |
| 4,253,544 A | 3/1981 | Dalmaso | |
| 4,282,011 A | 8/1981 | Terpay | |
| 4,299,015 A | 11/1981 | Marcus et al. | |
| 4,446,944 A | 5/1984 | Forrest et al. | |
| 4,515,254 A | 5/1985 | Markov et al. | |
| 4,523,426 A | 6/1985 | Scott et al. | |
| 4,538,702 A | 9/1985 | Wolner | |
| 4,571,765 A | 2/1986 | Okada et al. | |
| 4,588,208 A | 5/1986 | Yoshitsugu | |
| 4,604,315 A | 8/1986 | McCall et al. | |
| 4,618,026 A | 10/1986 | Olson | |
| 4,662,487 A | 5/1987 | Koch | |
| 4,745,883 A | 5/1988 | Baggetta | |
| 4,746,769 A | 5/1988 | Piper | |
| 4,853,275 A | 8/1989 | Tracy et al. | |
| 4,897,902 A | 2/1990 | Kavesh et al. | |
| 4,941,710 A | 7/1990 | Baymak et al. | |
| 4,958,853 A | 9/1990 | Doty | |
| 5,027,477 A | 7/1991 | Seron | |
| 5,039,168 A | 8/1991 | Baymak et al. | |
| 5,050,906 A | 9/1991 | Kneip | |
| 5,090,503 A | 2/1992 | Bell | |
| 5,113,981 A | 5/1992 | Lantz | |
| 5,143,187 A | 9/1992 | McQuarrie et al. | |
| 5,174,410 A | 12/1992 | Casebolt | |
| 5,202,177 A | 4/1993 | Kamper | |
| 5,207,363 A | 5/1993 | Duchi, Jr. et al. | |
| 5,287,943 A | 2/1994 | Bell | |
| 5,376,440 A | 12/1994 | Koseki | |
| 5,433,290 A | 7/1995 | Ellis et al. | |
| 5,464,252 A | 11/1995 | Kanazawa et al. | |
| 5,478,636 A | 12/1995 | Koseki | |
| 5,529,343 A | 6/1996 | Klink | |
| 5,564,476 A | 10/1996 | Golz | |
| 5,598,900 A | 2/1997 | O'Rourke | |
| 5,658,012 A | 8/1997 | Villarreal et al. | |
| 5,697,329 A | 12/1997 | Bell et al. | |
| 5,718,455 A | 2/1998 | Kawaguchi et al. | |
| 5,799,760 A | 9/1998 | Small | |
| 6,006,860 A | 12/1999 | Bell | |
| 6,085,802 A | 7/2000 | Silberberg | |
| 6,283,167 B1 | 9/2001 | Chang et al. | |
| 6,299,040 B1 | 10/2001 | Matias | |
| 6,347,466 B1 | 2/2002 | Lackner et al. | |
| 6,390,234 B1 | 5/2002 | Boyer | |
| 6,406,420 B1 | 6/2002 | McCarthy et al. | |
| 6,533,066 B1 | 3/2003 | O'Dell | |
| 6,572,148 B2 | 6/2003 | Wittenberg | |
| 6,648,101 B2 | 11/2003 | Kurtgis | |
| 6,660,668 B2 | 12/2003 | Tanabe et al. | |
| 6,739,427 B2 | 5/2004 | Gayetty | |
| 6,776,317 B1 | 8/2004 | Parker | |
| 6,959,784 B2 | 11/2005 | Diggle et al. | |
| 7,178,559 B2 | 2/2007 | Tielemans et al. | |
| 7,201,816 B2 | 4/2007 | Zafiroglu et al. | |
| 7,413,802 B2 | 8/2008 | Karayianni et al. | |
| 7,628,180 B1 * | 12/2009 | Golz | 139/409 |
| 7,665,288 B2 | 2/2010 | Karayianni et al. | |
| 7,665,575 B2 | 2/2010 | Tanaka et al. | |
| 7,677,360 B2 | 3/2010 | Tanaka et al. | |
| 7,726,350 B2 | 6/2010 | Jennings et al. | |
| 2002/0002745 A1 | 1/2002 | Crawford et al. | |
| 2002/0180199 A1 | 12/2002 | Schneider et al. | |
| 2003/0069557 A1 | 4/2003 | Driskell et al. | |
| 2003/0173150 A1 | 9/2003 | Sharp | |
| 2004/0173276 A1 | 9/2004 | Horikawa | |
| 2005/0056335 A1 | 3/2005 | Tielemans et al. | |
| 2005/0189169 A1 | 9/2005 | Tanaka et al. | |
| 2006/0027277 A1 | 2/2006 | Jennings et al. | |
| 2007/0068730 A1 | 3/2007 | Griffith | |
| 2007/0068731 A1 | 3/2007 | Griffith | |
| 2007/0210639 A1 | 9/2007 | Berger et al. | |
| 2008/0060872 A1 | 3/2008 | Wise | |
| 2008/0179136 A1 | 7/2008 | Griffith | |
| 2008/0190691 A1 | 8/2008 | Tanaka et al. | |
| 2008/0290643 A1 | 11/2008 | Hansen | |
| 2009/0023352 A1 | 1/2009 | Russell et al. | |
| 2009/0071749 A1 | 3/2009 | Burlaud et al. | |
| 2009/0114307 A1 | 5/2009 | Jennings et al. | |
| 2009/0194366 A1 | 8/2009 | Parker et al. | |
| 2011/0042165 A1 | 2/2011 | Griffith | |
| 2012/0037262 A1 * | 2/2012 | Russell | 139/383 R |

FOREIGN PATENT DOCUMENTS

| | | |
|---|---|---|
| EP | 0128662 A2 | 12/1984 |
| EP | 0496028 A1 | 7/1992 |
| EP | 0665142 B1 | 11/1996 |
| EP | 0851779 B1 | 8/2000 |
| EP | 1069008 A1 | 1/2001 |
| EP | 0923403 B1 | 4/2003 |
| JP | S5088684 | 12/1973 |
| JP | S59500450 | 3/1984 |
| JP | S6453777 | 4/1989 |
| JP | H03185150 | 8/1991 |
| JP | 584317 | 4/1993 |
| JP | 05141102 | 6/1993 |
| JP | 06081244 | 3/1994 |
| JP | H06066714 U1 | 9/1994 |
| JP | 07246909 | 9/1995 |
| JP | 08182770 | 7/1996 |
| JP | 2000185624 A | 7/2000 |
| WO | 9312838 | 7/1993 |
| WO | 9710876 | 3/1997 |
| WO | 9841284 | 9/1998 |
| WO | 0126738 | 4/2001 |
| WO | 0126738 A1 | 4/2001 |
| WO | 2007011336 A1 | 1/2007 |
| WO | 2007021278 A1 | 2/2007 |
| WO | 2014143411 | 9/2014 |

OTHER PUBLICATIONS

International Patent Application No. PCT/US2014/012417, International Search Report and Written Opinion mailed Apr. 16, 2014, 13 pages.

Chinese Application No. 201180033002.5,0ffice Action mailed on Mar. 10, 2015, 12 pages (4 pages for the original document and 8 pages for the English translation).

European Patent Application No. EP 11816719.6, European Supplementary Search Report mailed May 8, 2013 (9 pages).

European Patent Application No. 11816719.6, Communication pursuant to Article 94(3) EPC mailed on Jun. 11, 2014, 6 pages.

(56) References Cited

OTHER PUBLICATIONS

International Patent Application No. PCT/US2005/025043, International Search Report and Written Opinion mailed Nov. 1, 2005 (4 pages).

International Patent Application No. PCT/US2005/029140, International Search Report and Written Opinion mailed Jan. 13, 2006 (4 pages).

International Patent Application No. PCT/US2009/033431, International Search Report and Written Opinion mailed May 8, 2009 (15 pages).

International Patent Application No. PCT/US2011/031075, International Search Report and Written Opinion mailed Dec. 28, 2011 (8 pages).

International Patent Application No. PCT/US2011/031075, International Preliminary Report on Patentability mailed Feb. 12, 2013 (4 pages).

International Application No. PCT/US2014/012417, International Preliminary Report on Patentability mailed on Sep. 24, 2015, 10 pages.

* cited by examiner

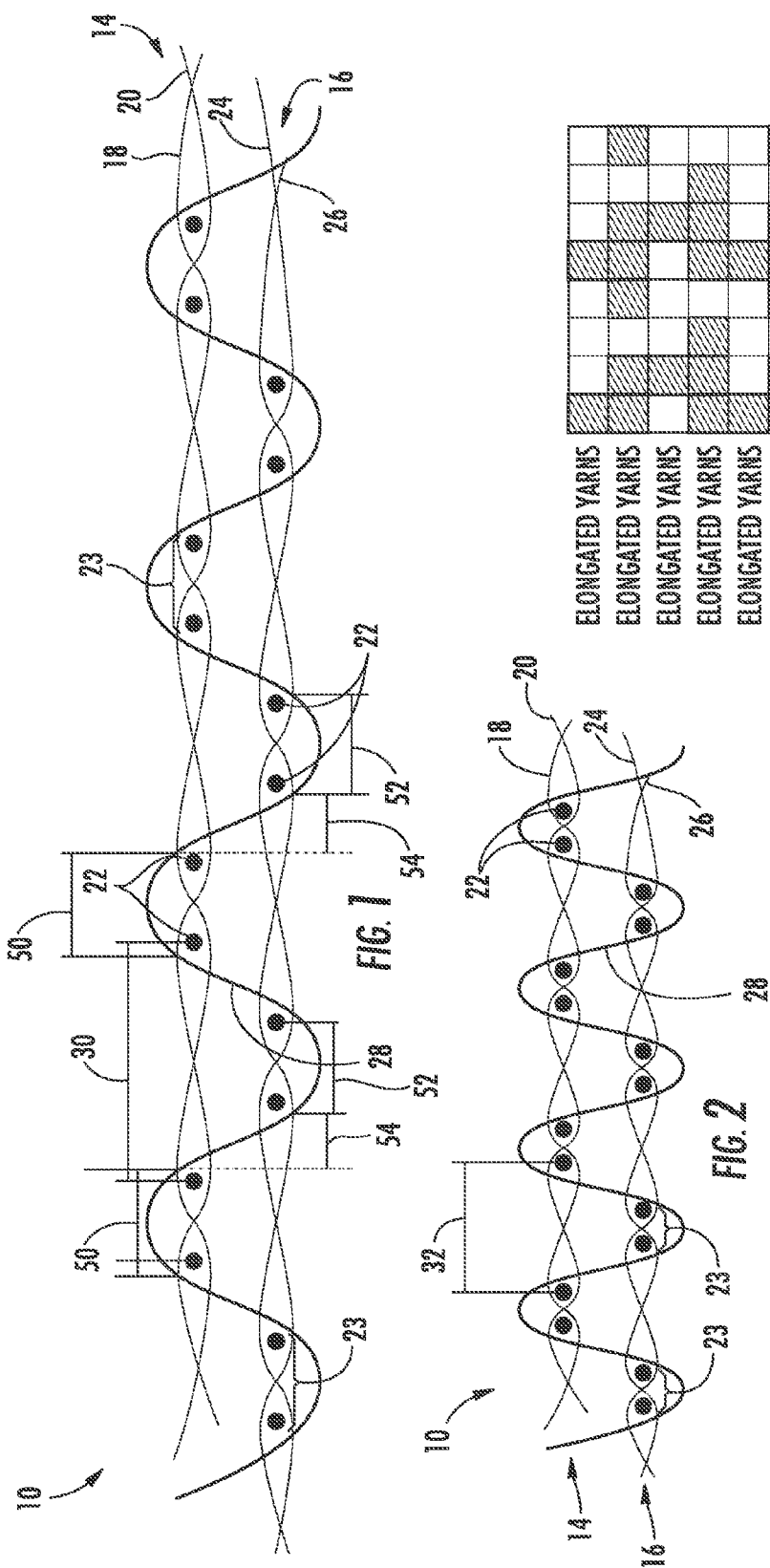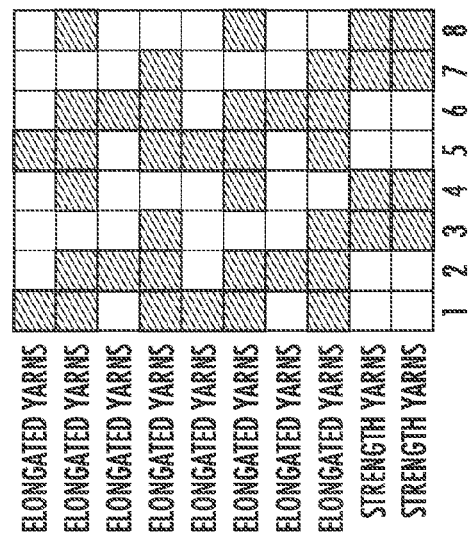

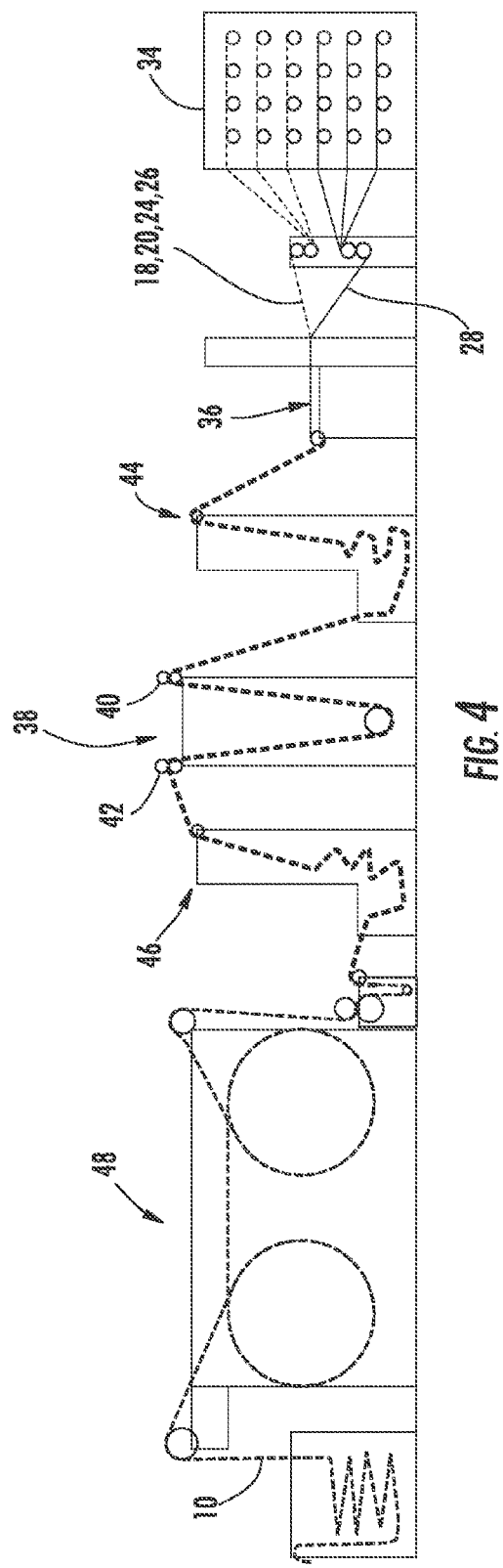

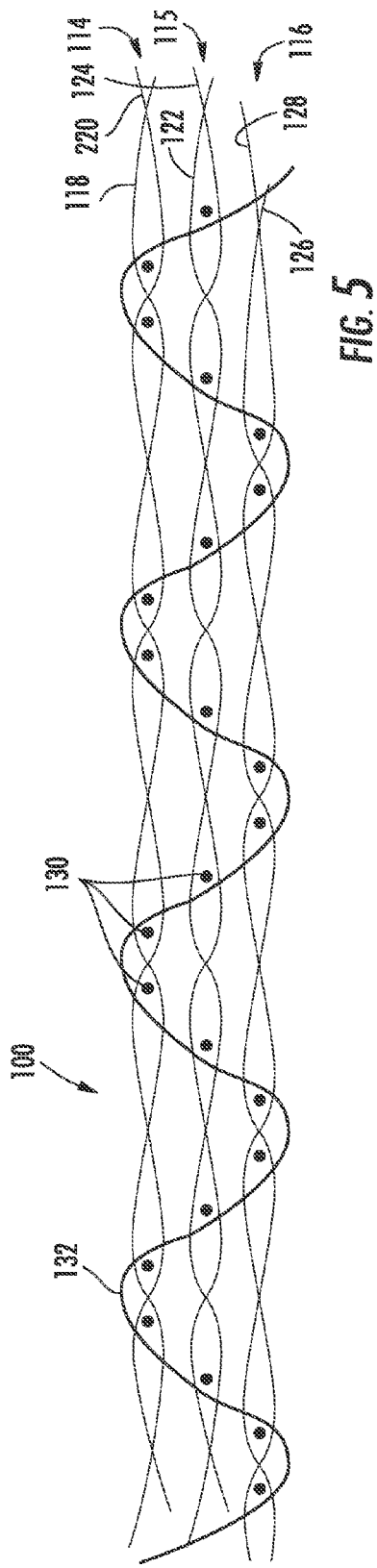

| QUAD LEVEL WEAVE | | | | | | | | |
|---|---|---|---|---|---|---|---|---|
| ELONGATED YARNS | O | X | O | O | O | O | O | O |
| ELONGATED YARNS | X | X | O | X | O | O | O | O |
| ELONGATED YARNS | X | X | X | X | O | O | O | O |
| ELONGATED YARNS | X | X | X | O | X | O | O | X |
| ELONGATED YARNS | X | X | O | X | O | X | O | X |
| ELONGATED YARNS | X | X | X | O | O | O | O | O |
| ELONGATED YARNS | X | X | X | X | X | O | O | X |
| ELONGATED YARNS | X | X | X | X | X | X | X | X |
| STRENGTH YARNS | X | O | O | O | O | O | X | X |
| | 1 | 2 | 3 | 4 | 5 | 6 | 7 | 8 |

ENERGY ABSORBING FABRIC AND METHOD OF MANUFACTURING SAME

RELATED APPLICATIONS

This application is related to U.S. application Ser. No. 12/855,341 filed on Aug. 12, 2010 and titled "Retractable Energy Absorbing Webbing and Method of Manufacturing Same," which is pending, the contents of which are hereby incorporated by reference.

FIELD OF THE INVENTION

Embodiments relate to energy absorbing fabrics.

BACKGROUND OF THE INVENTION

People at elevated positions above a floor or other relatively lower surface are at risk of falling and injury. For example, workers and other personnel who have occupations that require them to be at elevated positions, such as on scaffolding, are at risk of falling and injury. Safety harnesses are often worn to stop a person's fall and prevent or reduce injury.

Safety harnesses typically have a harness portion worn by the user and a tether or lanyard extending from the harness portion. The lanyard connects the harness portion to a secure structure. If a person falls from the elevated position, the safety harness stops the person's fall when the lanyard is straightened.

A load limiter on a seat belt system can be worn to secure the occupant of a vehicle in the event of a sudden stop or collision to reduce the risk of injury. If a person is subjected to inertia due to a vehicle's sudden stop, the load limiter limits the person's forward movement when the load limiter is straightened.

Retractable lanyard devices are used in some fall protection applications, and retractable load limiter devices are used in some seat belt systems. Retractable lanyard devices are typically comprised of a flat webbing that is capable of being received within a retractor. Existing retractable lanyard devices have a mechanical device in the retractor to stop the fall (by preventing the webbing from advancing further out of the webbing) or to dissipate energy (by deforming metal). With typical retractable lanyards devices, however, the person's movement is stopped rather abruptly and the person is subjected to the shock force of the abrupt stop. Moreover, existing retractable lanyard devices are bulky, heavy, and costly.

Lanyards that attempt to absorb the shock of a person's fall are known. Such lanyards, however, have bunched, accordion-type sections that lengthen as energy is absorbed. These bunched sections prevent the use of an energy absorbing webbing in a retractor, since a retractor requires the use of a flat webbing.

SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Certain embodiments of the invention generally pertain to energy absorbing fabrics and lanyards, and methods of making them. More specifically, some embodiments of the invention pertain to an energy absorbing fabric that is generally flat and therefore capable of being received within a retractor, and that is capable of sufficient elongation (in some embodiments, up to approximately 100% elongation or more) when subjected to a load.

BRIEF DESCRIPTION OF THE FIGURES

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

FIG. 1 is a weaving pattern of an energy absorbing fabric according to one embodiment, shown before the fabric is heat treated.

FIG. 2 is a weaving pattern of the energy absorbing fabric of FIG. 1, shown after the fabric is heat treated.

FIG. 3 is a pick diagram of a weaving pattern of the energy absorbing fabric of FIG. 1 according to one embodiment of the invention.

FIG. 4 is a schematic illustrating the various continuous processes that may be used to form an energy absorbing fabric according to one embodiment.

FIG. 5 is a weaving pattern of an energy absorbing fabric according to another embodiment, shown before the fabric is heat treated.

FIG. 6 is a pick diagram of a weaving pattern of the energy absorbing fabric of FIG. 5 according to one embodiment of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 11:
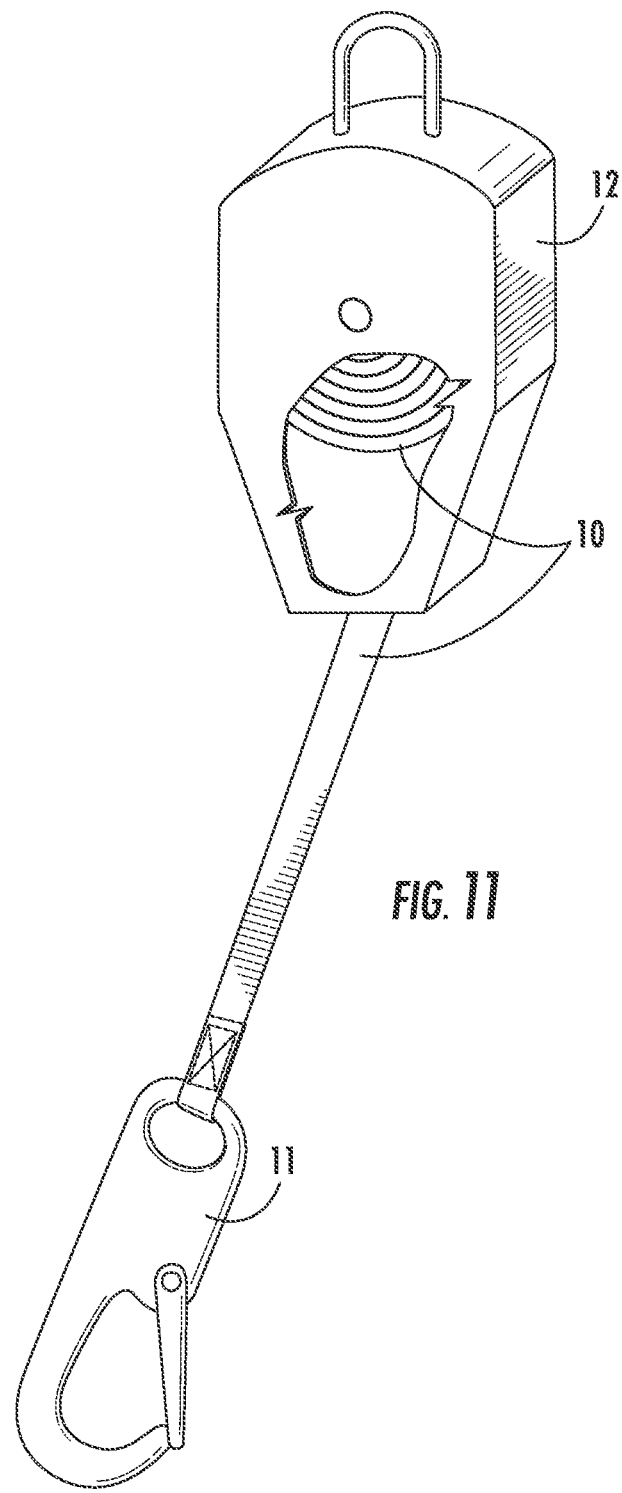
FIG. 11 is a perspective view of a retractor in use with an energy absorbing fabric according to one embodiment.

Certain embodiments provide fabrics 10 that are capable of elongating in length up to approximately 100% or more of their un-deployed length when subjected to a load. In some embodiments, the fabrics are generally flat and thus are suitable for use in retractors, such as retractor 12 shown in FIG. 11.

Figures 7, 8:
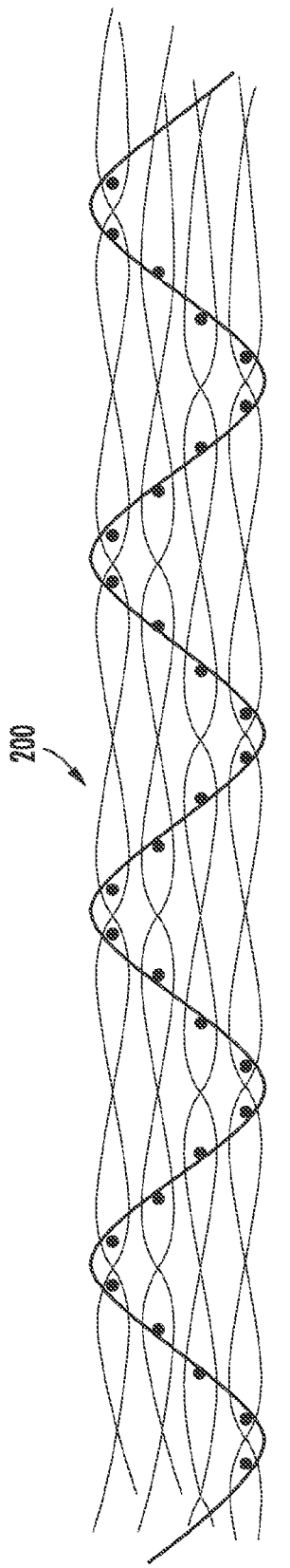
FIG. 7 is a weaving pattern of an energy absorbing fabric according to another embodiment, shown before the fabric is heat treated.
FIG. 8 is a pick diagram of a weaving pattern of the energy absorbing fabric of FIG. 7 according to one embodiment of the invention.

Although the fabric 10 shown in FIGS. 1-2 is a two-ply structure, the fabric of this invention may have any suitable number of plys (for example, FIG. 5 illustrates a three-ply structure and FIG. 7 illustrates a four-ply structure). FIG. 1 illustrates the weaving pattern of fabric 10 before it is heat treated, while FIG. 2 illustrates the weaving pattern of fabric 10 after the fabric 10 is heat treated.

Fabric 10 includes a first layer 14 and a second layer 16. First layer 14 is formed by interweaving elongation yarns 18, 20 together, where elongation yarns 18, 20 extend along the fabric in a substantially warp direction. Similarly, second layer 16 is formed by fabric elongation yarns 24, 26 together, where elongation yarns 24, 26 extend along the fabric in a substantially warp direction.

Lateral yarns 22 (also referred to as "weft" or "pick" yarns) are woven in a substantially weft direction across a width of the fabric 10 to secure the elongation yarns 18, along the first layer 14 and to secure the elongation yarns 24, 26 along the second layer 16 laterally across the fabric 10. In some embodiments, the lateral yarns 22 are approximately 1,000 denier polyester yarns. In other embodiments, the lateral yarns 22 are industrial filament polyester, nylon, Nomex®, Kevlar®, or any other suitable yarn.

Binder yarns 28 interweave between the elongation yarns 18, 20 of the first layer 14 and the elongation yarns 24, 26 of the second layer 16 to secure the two layers 14, 16 together. In some embodiments, as shown in FIGS. 1-2, at least one of the binder yarns 28 transitions from the first layer 14 to the second layer 16 and vice versa in an alternate weaving pattern such that the at least one of the binder yarns 28 transitions from the first and second layers 14, 16 in between groups of lateral yarns 22, such as groups 23 of lateral yarns 22. Although groups 23 are illustrated in FIG. 1 as including pairs of lateral yarns 22, groups 23 may include any suitable number of lateral yarns (including one or more lateral yarns), the number of which may vary across the length of the fabric 10.

Moreover, the binder yarn 28 exits and reenters the layers 14, 16 along various portions of the fabric 10. Specifically, referring to FIG. 1, the fabric 10 includes plurality of first portions 50 that correspond to the section of the fabric 10 between where the binder yarn 28 exits the first layer 14 and reenters the first layer 14. In this particular embodiment, each of the first portions 50 includes a pair of lateral yarns 22 (groups 23), although or more less lateral yarns could be included in each of the first portions. The fabric 10 also includes a plurality of second portions 52 that corresponds to the section of the fabric between where the binder yarn 28 exits the second layer 16 and reenters the second layer 16. In this particular embodiment, each of the second portions 52 includes a pair of lateral yarns 22 (groups 23), although or more less lateral yarns could be included in each of the second portions. Third portions 54 extend between the first portions 50 and the second portions 52. In the embodiment of FIGS. 1-2, no lateral yarns 22 are present in the first layer 14 or the second layer 16 along the third portions 54. In some embodiments, no lateral yarns 22 are present in the first layer 14 between consecutive first portions 50 and no lateral yarns 22 are present in the second layer 16 between consecutive second portions 52.

In some embodiments, binder yarns 28 are nylon, polyester, Kevlar®, Dyneema®, or any other high modulus, high tenacity yarns or other suitable materials that are relatively higher strength (as compared with the elongation yarns) and that do not shrink or shrink substantially less than the elongation yarns 18, 20, 24, and 26 during heat treatment. For example, in some embodiments, the binder yarns 28 have a strength of at least 5,000 pounds tensile strength. In other embodiments, the binder yarns have a nominal breaking strength of greater than 5,400 pounds and, in some embodiments, have a nominal breaking strength exceeding 6,000 pounds, in compliance with 29 C.F.R. 1926.104 (d) (2008), American National Standards Institute ("ANSI") Z335.1, Canadian standard Z259.1.1 Class 1A and 1B, European standard BS EN 355:2002, and Australian standard AN/NZS 1891.1.1995.

Elongation yarns 18, 20, 24, and 26 are highly extensible yarns that significantly elongate when placed under a tensile load. As stated above, in some embodiments, the elongation yarns are woven such that they are capable of elongating (even after heat treatment) up to at least approximately 100% of their undeployed length when subjected to a load/predetermined tensile force. Upon elongation, elongation yarns 18, 20, 24, and 26 serve as an energy absorbing member of the fabric 10 by absorbing some of the force or energy applied to the fabric under the load. In one embodiment, the elongation yarns 18, 20, 24, and 26 are partially oriented yarns (POY) made of polymer materials such as polyester, but the elongation yarns 18, 20, 24, and 26 can be made from one or more suitable materials having high elongation properties and the ability to shrink in length substantially more than the binder yarns, such as during heat treatment. In some embodiments, each of the elongation yarns has a linear density of between approximately 300 denier and approximately 5,580 denier.

Important properties of the elongation yarns 18, 20, 24, and 26, which serve as the energy absorbing member, include some or all of high elongation, high shrinkage, and high shrink-force (the force produced during the shrinkage). The elongation yarns 18, 20, 24, and 26 should have sufficiently high elongation and load bearing properties under load to absorb the load energy so as to reduce shock to a person or other body in a sudden deceleration state such as that caused by a fall from a building, a parachute deploying, or an impact due to an automobile or aircraft or other vehicular accident or a blast. In some embodiments, the fabrics are adapted for use where dissipation of kinetic energy is required.

In some embodiments, binder yarns 28 shown in FIG. 1 are longer than elongation yarns 18, 20, 24, and 26 before the fabric 10 is heat treated. In one non-limiting embodiment, the binder yarns 28 are approximately 40% longer than the elongation yarns, although this may vary in other embodiments. When the fabric 10 is heat treated, elongation yarns 18, 20, 24, and 26 shrink even more relative to binder yarns 28, since binder yarns 28 do not shrink when heat treated. Because there is sufficient distance between the layers 14, 16, binder yarns 28 can be longer in length relative to elongation yarns 18, 20, 24, and 26 before fabric 10 is heat treated.

The fabrics described herein may be formed on any desired programmable loom, such as a needle loom. As described above, the fabric 10 includes elongation yarns 18, 20, 24, and 26, binder yarns 28, and lateral yarns 22. FIG. 3 is a pick diagram (also known as a chain diagram or cam draft) for the fabric 10. The squares along the horizontal axis represent the weaving path/throw of the lateral yarns 22, and the vertical axis corresponds to various warp yarns (such as binder yarns 28) or groups of warp yarns (such as elongation yarns 18, 20, 24, and 26) as labeled. The pick diagram of FIG. 3 shows an eight harness loom. When a square is shaded, it indicates that the harness corresponding to that square is lifted as the lateral yarn 22 is thrown across the loom.

In one embodiment, fabric 10 is heat treated to shrink the length of the elongation yarns 18, 20, 24, and 26, as reflected in FIG. 2. When the fabric 10 is heat treated, the elongation yarns 18, 20, 24, and 26 shrink in length while the binder yarns 28 do not, resulting in an even greater weave-in of the elongation yarns 18, 20, 24, and 26 than the weave-in of the binder yarns 28, where weave-in refers to the percentage by which one yarn is longer than the fabric into which it is woven.

With reference to FIG. 1, distance 30 corresponds to the distance between the last lateral yarn 22 of a first group 23 and the first lateral yarn 22 of a second, consecutive group 23 along one layer of the fabric before the fabric 10 is heat treated. In this particular embodiment with this particular elongation, this distance 30 is approximately twice the distance 32, which corresponds to the distance between that same last lateral yarn 22 of a first group 23 and that same first lateral yarn 22 of the second, consecutive group 23 along the same layer of the fabric, but after the fabric 10 is heat treated (FIG. 2). In some cases, distance 30 generally (but not necessarily exactly) corresponds to the distance between two consecutive first sections 50 along the first layer 14 of the fabric and to the distance between two consecutive second sections 52 along the second layer 16 of the fabric before the fabric 10 is heat treated, while distance 32 generally (but not necessarily exactly) corresponds to the distance between two consecutive first sections 50 along the first layer of the fabric and to the distance between two consecutive second sections 52 along the second layer of the fabric, but after the fabric 10 is heat treated (FIG. 2). If a different elongation of the fabric is targeted, the ratio between distances 30 and 32 may change, as described below.

Because the elongation yarns 18, 20, 24, and 26 are permitted to shrink as much as approximately 50% or more, the fabric 10 after heat treatment is capable of significant elongation when subjected to a load. As mentioned, in some embodiments, the fabric 10 can achieve up to at least 100% elongation of its undeployed length when subjected to a load. The weaving pattern of binder yarns 28 with elongation yarns 18, 20, 24, and 26, including but not limited to the length of first, second, and third sections, and the distance between consecutive first sections and between consecutive second sections, may change depending on the desired shrinkage of the elongation yarns (which in turn determines the amount of elongation of the fabric 10).

In some embodiments, the binder yarns 28 start with an about 40% weave-in, such that the length of the binder yarns 28 is approximately 40% greater than the length of the fabric 10 and the length of the elongation yarns 18, 20, 24, and 26 before heat treatment. In some embodiment, the elongation yarns have a relatively small weave-in, such as around 5%. With this weave-in percentage, the fabric 10 is capable of approximately 30% or more elongation. In other embodiments, the weave-in percentages vary depending on the amount of desired elongation. In general, if less maximum elongation is targeted, the required weave-in of the binder yarns would also be less; if more maximum elongation is targeted, the weave-in of the binder yarns would be more.

In one embodiment, after the fabric 10 is subjected to heat treatment, the length of the elongation yarns 18, 20, 24, and 26 and the length of the fabric 10 shrink by at least approximately 50%, while the binder yarns 28 do not have more than minimal shrinkage. Thus, in this embodiment, the elongation yarns 18, 20, 24, and 26 will increase slight to around 10% weave-in (due to the general contraction of the fabric 10) while the binder yarns 28 will have around 90% or greater weave-in. In this way, the relative lengths of the elongation yarns 18, 20, 24, and 26 and the binder yarns 28 are automatically adjusted upon heat treatment. In one embodiment, the fabric 10 is heat treated in a manner so that shrinkage of the elongation yarns 18, 20, 24, and 26 is controlled.

In some embodiments, because of the weaving pattern of the binder yarns 28 relative to the elongation yarns 18, 20, 24, and 26 (and more specifically, the exit and re-entry of the binder yarns 28 from the layers 14, 16 of the fabric), the fabric 10 has increased cut and abrasion resistance because the binder yarns 28 serve as strength members with extra tenacity compared to the elongation yarns 18, 20, 24, and 26. This is in part because the binder yarns 28 exit from the layers essentially forms bands 56 (see FIGS. 12-13) around the elongation yarns 18, 20 and around the elongation yarns 24, 26 across a width W of the fabric 10 at various points along the length of the fabric 10. The bands 56 of binder yarns 28 around the elongation yarns help protect the elongation yarns. In some embodiments, the bands correspond to the first and second portions 50, 52 (FIG. 1), along which the binder yarns 28 are external to the first and second layers 14, 16, respectively (and thus are external to the elongation yarns 18, 20 and 24, 26, respectively).

Figure 12:
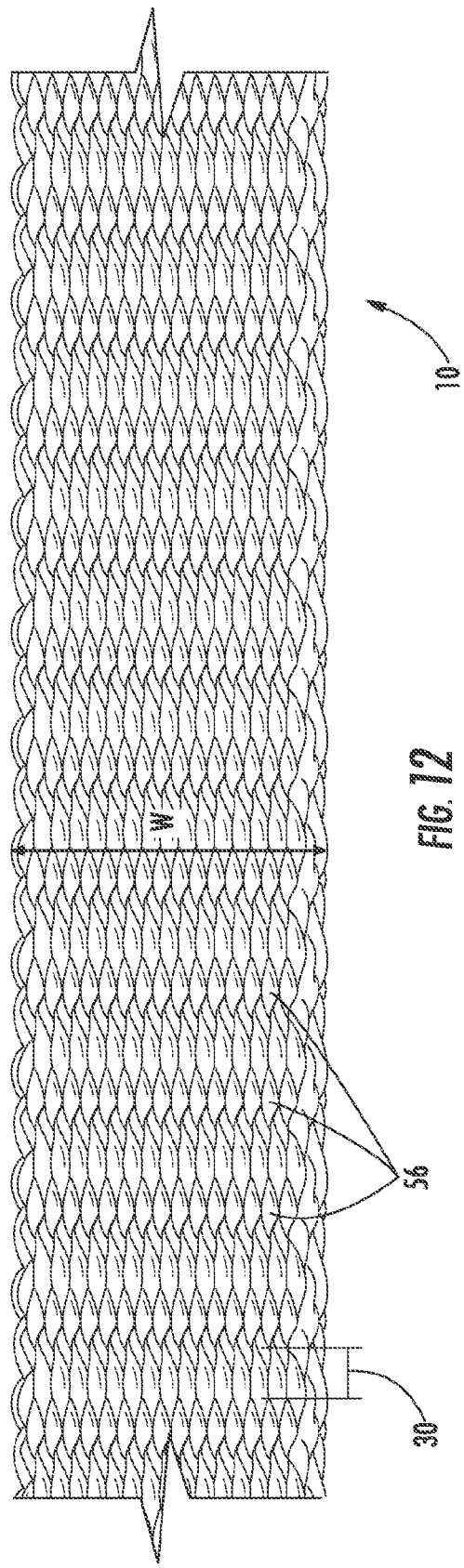
FIG. 12 is a perspective view of an energy absorbing fabric according to one embodiment, shown before heat treatment.
Figure 13:
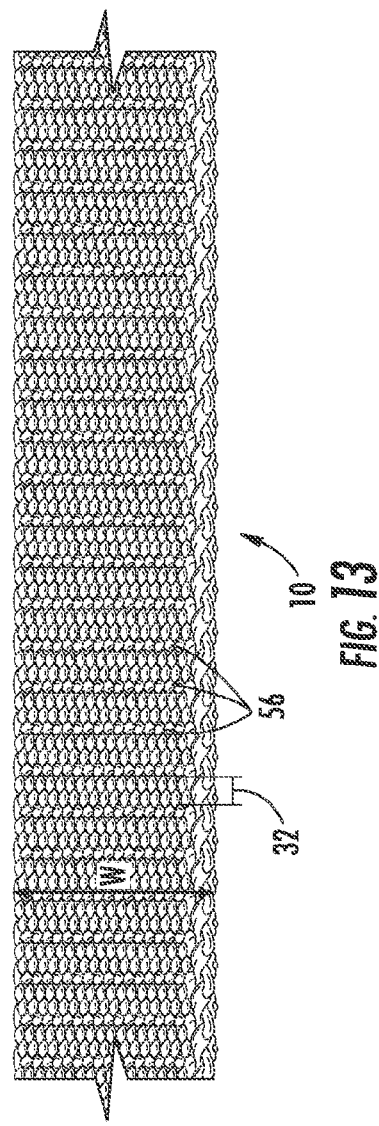
FIG. 13 is a perspective view of an energy absorbing fabric according to one embodiment, shown after heat treatment.

After the fabric 10 is heat treated, the distance between two consecutive bands 56 along either the first or second layers 14, 16 shrinks so that the bands 56 are closer to one another after heat treatment than they were before heat treatment. With reference to FIGS. 12-13, distance 30 between two consecutive bands 56 along the top layer 14 of the fabric 10 before heat treatment (FIG. 12) is greater than distance 32 between two consecutive bands 56 along the first layer 14 of the fabric 10 after heat treatment (FIG. 13).

In some embodiments, one end of the fabric 10 is attached to a hardware component, such as a clip 11, metal clasp, harness, or seatbelt component, while the other end of the fabric 10 is situated within a retractor 12 (shown in FIG. 11) that is then secured to a stable structure. In some embodiments, one end of the fabric 10 is attached to a harness and/or a clip for attachment to a child seat for use, for example, in an automobile or other vehicle.

In some embodiments, the fabric 10 is used as a deceleration device, to secure the occupant of a vehicle against harmful movement that may result from a sudden stop, or in any other application where rapid human or other body deceleration may occur. When using the fabric as a fall protection device, one end of the fabric 10 is securely attached to a safety harness worn by a user. The opposite end of the fabric 10 is securely attached to a fixed structure. If the user falls, the fabric 10 stops the person's fall and reduces the shock felt by the person as the user is brought to a controlled deceleration. As the person falls, the fabric 10 straightens and the load of the user is applied to the fabric 10. The elongation yarns 18, 20, 24, and 26 stretch and absorb the force of the load applied to the fabric 10. As the elongation yarns 18, 20, 24, and 26 stretch, the fabric 10 elongates. In the embodiments where the fabric is used with a retractor, once the fabric 10 has retracted from the retractor 12, the fabric 10 stops the person from falling any farther. The shock of stopping the fall that would otherwise be felt by the falling person is reduced or cushioned by the energy-absorbing elongation yarns 18, 20, 24, and 26.

In some embodiments, the fabric 10 includes a feature that indicates if the fabric has deployed (in other words, used in a fall event such that the elongation yarns have elongated to absorb the force of the load). One non-limiting example of such a feature is a label or other identifier that is glued or otherwise adhered or affixed along at least a portion of the fabric 10. Once the fabric 10 has deployed, the glue or other adhesive will break and the label will be destroyed, thus indicating that the fabric has deployed and should not be reused.

FIG. 4 illustrates one non-limiting continuous process used to form fabric 10. In particular, elongation yarns 18, 20, 24, and 26 and binder yarns 28 are stored on a creel 34 and fed to a suitable loom 36. After the various yarns are woven on the loom 36 into fabric 10, the fabric 10 is subjected to heat treatment by heat treatment apparatus 38 to reduce the length of the elongation yarns (and thus the length) of the fabric 10. The heat treatment apparatus 38 includes a first set of rollers 40, a second set of rollers 42, and a heat source located between the first and second set of rollers. Optionally, the apparatus may also include controls and/or monitors to control and/or monitor the feed ratio between the two sets of rollers and/or the temperature of the heat source. In some cases, accumulated fabric is stored at either or both of boxes 44, 46. Fabric 10 may then be subjected to dying at dying apparatus 48.

In one embodiment, the fabric 10 is fed through the first set of rollers 40 to the heat source, and out through the second set of rollers 42. In certain embodiments, the amount of shrinkage of the elongation yarns 18, 20, 24, and 26 is controlled by varying the difference in speed of the first set of rollers 40 and the speed of the second set of rollers 42. This difference in speed is referred to herein as the feed ratio of the rollers and can varied depending on the desired elongation properties of the finished product.

In one embodiment, the speed at which the fabric 10 is fed through the first set of rollers 40 is greater than the speed at which the fabric 10 is fed through the second set of rollers 42. For example, in one embodiment, the feed speed associated with the first set of rollers 40 is approximately 1 yards per minute, while the feed speed associated with the second set of rollers 42 is approximately 0.5 yards per minute, for a feed ratio of 2:1, although other suitable feed ratios may be used depending on the desired amount of elongation. Since the fabric 10 is exiting the heat source at a speed that is generally 50% of the speed at which it entered the heat source, the fabric 10 is subjected to an over feed ratio of 2:1 during heat treatment by the heat source. In this way, the elongation yarns 18, 20, 24, and 26 will remain in tension between the first set of rollers and the second set of rollers and will be allowed to shrink approximately 50%, while the other materials (such as the binder yarns 28) are gathered by the forces of the elongation yarn shrinkage, which results in a greater than 90% weave-in and a length reduction of 50% or other suitable percentage. Because the elongation yarns 18, 20, 24, and 26 shrink when subjected to heat, while the binder yarns 28 do not have more than minimal shrinkage, the heat treatment process adjusts the relative length of the elongation yarns and the binder yarns. In some embodiments, the fabric 10 is subjected to approximately less than 5 minutes of heat treatment at a temperature of about 220° F.

The number of elongation yarns 18, 20, 24, and 26 in the fabric 10 may be varied to adjust the forces required to elongate the fabric 10. Similarly the weaving pattern may be adjusted as described above to vary the amount of shrinkage of the elongation yarns 18, 20, 24, and 26 in the fabric 10, or the relative difference in length between the elongation yarns 18, 20, 24, and 26 and the binder yarns 28 of the fabric 10. As described above, the difference in length between the elongation yarns and the binder yarns is caused by the difference in weave-in of the yarns. Thus, the difference in weave-in of the yarns can be altered depending on the desired elongation properties of the fabric 10. Similarly, the feed ratios between the first set of rollers 40 and the second set of rollers 42 may be varied to adjust the forces required to elongate the fabric 10 and the elongation distance of the fabric 10. In addition, the duration and amount of heat applied to the fabric 10 also may be varied to adjust the forces required to elongate the fabric 10 and the elongation distance of the fabric 10. This allows the properties of the fabric 10 to be tailored to the needs of the user and/or the application. As stated above, the weaving pattern can be adjusted in other ways to vary the elongation distance of the fabric 10, such as by varying the distance between consecutive first sections 50 and consecutive second sections 52 (and thus generally the distance between bands 56) areas and/or the number of lateral yarns 22 included in the first and second sections 50, 52. Moreover, the thickness of the fabric may be varied (such as increasing the thickness by adding additional layers as described below or adding more space in between layers).

Moreover, the number of layers of elongation yarns present in the fabric may vary. FIGS. 5-6 show an alternate embodiment of a fabric 100 (before heat treatment) that is similar to fabric 10 described above, except it is a three-ply structure. In particular, fabric 100 includes a first layer 114, a second layer 115, and a third layer 116. Elongation yarns 118 and 120 extend in a substantially warp direction along the first layer 114 of fabric 100, elongation yarns 122 and 124 extend in a substantially warp direction along the second layer 115 of fabric 100, and elongation yarns 126 and 128 extend in a substantially warp direction along the third layer 116 of fabric 100. Lateral yarns 130 extend in a substantially weft direction along the width of the fabric 100 to secure the elongation yarns to one another. Binder yarns 132 extend in a substantially warp direction to interweave the elongation yarns 118, 120, 122, 124, 126, 128 together across all three layers as described above.

FIGS. 7-8 show an alternate embodiment of a fabric 200 (before heat treatment) that is similar to fabrics 10, 100 described above, except it is a four-ply structure having four layers.

Various heat treating processes may be used to shrink the elongation yarns. For example, a continuous oven may be used in an in-line, continuous heating process. The fabrics 10, 100, and 200 may be continuously woven and fed into the continuous oven for heat treatment. Another example of heat treatment is a batch process in which individual fabrics are heat treated.

Figure 9:
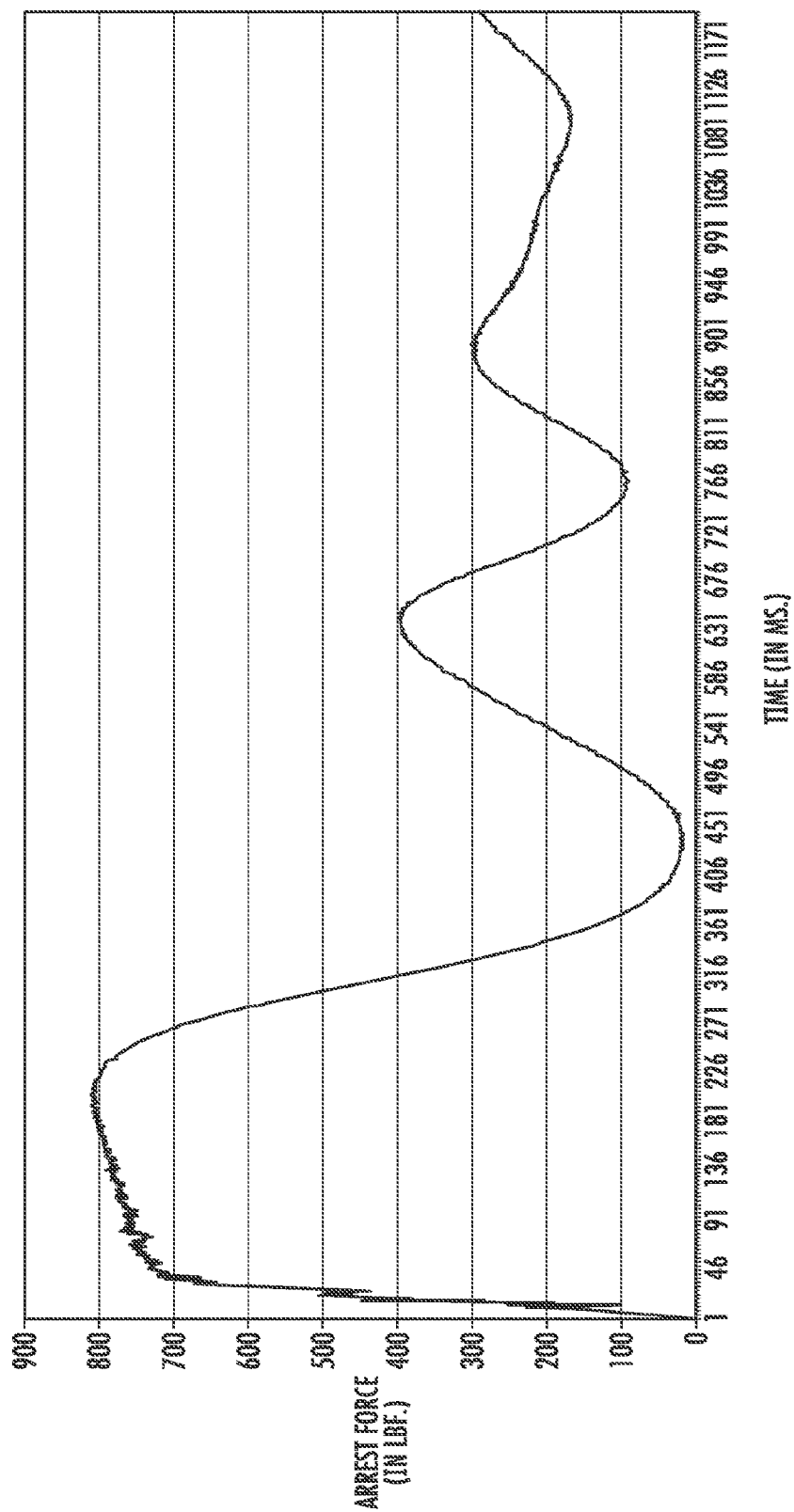
FIGS. 9-10 illustrate graphs showing the energy absorption of fabrics according to various embodiments as the fabrics are subjected to a load associated with a fall event.
Figure 10:
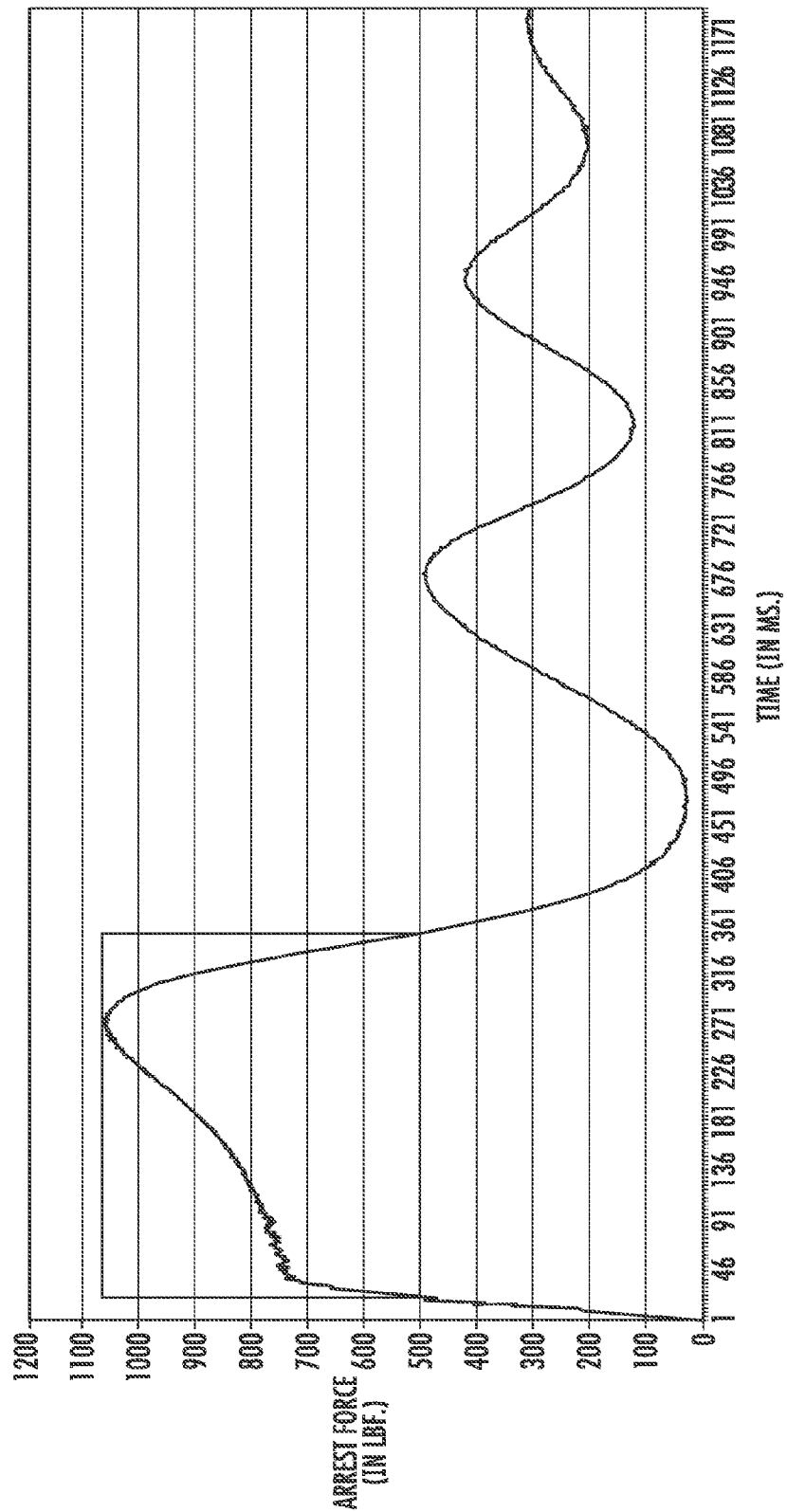

The weaving pattern of fabrics 10, 100, and 200 is such that the fabric 10 is generally flat and suitable for use in a retractor. Because the fabrics 10, 100, and 200 are capable of relatively high shrinkage along distances 30, the elongation capabilities of the fabrics 10, 100, and 200 are significantly higher than previous generally flat fabrics. Because the elongation capabilities of the fabrics 10, 100, and 200 are significantly higher than previous generally flat fabrics, the fabrics 10, 100, and 200 have much greater energy absorbing capabilities (as illustrated in by graphs of FIGS. 9-10, which show the arrest force (in lbf units) along the vertical axis and time (in ms units) along the horizontal axis) and is thus suitable in applications that other previous generally flat fabrics were not, for example, but not limited to, fall protection devices, blast attenuation devices, load limiters, etc. FIG. 9 represents a 220 pound weight and 6 foot free fall and shows that the energy is absorbed while holding the arrest force to around 800 lbf. FIG. 10 represents a 282 pound weight and 6 foot free fall and shows that the energy is absorbed while holding arrest force to less than 1110 lbf. In an automotive seat belt, for example, the arrest force is about 900 lbf and deployment distance is around 6 inches.

As one non-limiting embodiment, a fabric is designed to stop a falling person within 3.5 feet, which is in compliance with 29 C.F.R. 1926.104 (d) (2008). In this embodiment, the fabric has a finished, ready-for-use length of about 6 feet. Prior to the heat treatment, the elongation yarns of this fabric have a length of approximately 9 feet, while the binder yarns have a length of approximately 12.6 feet. After heat treatment, the elongation yarns have a reduced length of about 6 feet and the binder yarns essentially retain their length of 12.6 feet. During use of the fabric, the elongation yarns will stretch from about 6 feet to about 9 feet. When the fabric reaches the maximum 9.5 feet length, the fabric 10 stops the person's fall. The elongation yarns absorb the energy of the fall and reduce the abrupt shock to the person when the fabric stops the fall.

In other embodiments, the fabric has a finished, ready-to-use length of about 4 feet. In one embodiment having a ready-to-use length of about 4 feet, the percentage of elongation yarns to binder yarns is approximately the same as described above, however, the ratio of binder yarns to elongation yarns may vary depending on the application. For example, more binder yarns to elongation yarns may be required for higher strength applications, and more elongation yarns to binder yarns may be required when a greater deployment force is required.

In another embodiment of the present invention, a fabric has is configured to stop a falling person within about 11.75 feet. The fabric, however, can be made in any desired length according to the present invention.

The fabrics of the present invention can be made of any suitable materials including, but not limited to, synthetic material yarns woven to form the fabric structure.

Various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A fabric comprising:
   (i) a first layer comprising a first set of elongation yarns extending in a substantially warp direction and a first set of lateral yarns extending in a substantially weft direction across the fabric between the first set of elongation yarns such that the elongation yarns of the first set of elongation yarns are interwoven with one another by the first set of lateral yarns;
   (ii) a second layer comprising a second set of elongation yarns extending in the substantially warp direction and a second set of lateral yarns extending in the substantially weft direction across the fabric between the second set of elongation yarns such that the elongation yarns of the second set of elongation yarns are interwoven with one another by the second set of lateral yarns; and
   (iii) a plurality of binder yarns that are interwoven between the first layer and the second layer to bind the first set of elongation yarns with the second set of elongation yarns,
   wherein at least one of the plurality of binder yarns interweaves pairs of lateral yarns of the first set of lateral yarns in the first layer with pairs of lateral yarns of the second set of lateral yarns in the second layer,
   wherein the at least one of the plurality of binder yarns exits the first layer and reenters the first layer along a plurality of first sections such that each of the first sections includes one of the pairs of lateral yarns of the first set of lateral yarns and such that no lateral yarns are present in the first layer between consecutive first sections of the plurality of first sections,
   wherein the at least one of the plurality of binder yarns exits the second layer and reenters the second layer along a plurality of second sections such that each of the second sections includes one of the pairs of lateral yarns of the second set of lateral yarns and such no lateral yarns are present in the second layer between consecutive second sections of the plurality of second sections, and
   wherein the elongation yarns have a shrinkage characteristic that is greater than a shrinkage characteristic of the binder yarns and wherein the binder yarns have a tensile strength that is greater than a tensile strength of the elongation yarns.

2. The fabric of claim 1, wherein, after the fabric is heat treated and upon subjection to a load, a length of the fabric is capable of elongating up to approximately 100% relative to an undeployed length of the fabric.

3. The fabric of claim 1, further comprising one or more additional layers of elongation yarns extending in a substantially warp direction and interwoven with one another by an additional set of lateral yarns, wherein the one or more additional layers is positioned between the first layer and the second layer.

4. The fabric of claim 1, wherein the first and second sets of elongation yarns are partially oriented yarns.

5. The fabric of claim 1, wherein a length of the binder yarns is greater than an original length of the first and second sets of elongation yarns.

6. The fabric of claim 1, wherein a weave-in of the plurality of binder yarns is greater than a weave-in of the first and second sets of elongation yarns.

7. The fabric of claim 1, wherein the fabric is generally flat.

8. The fabric of claim 1, wherein a length of the fabric shrinks by at least approximately 40% when heat treated.

9. The fabric of claim 1, wherein a selected one of the plurality of second sections is between the consecutive first sections and wherein a selected one of the plurality of first sections is between the consecutive second sections.

10. A fabric comprising:
   (i) a first layer comprising a first set of elongation yarns extending in a substantially warp direction and a first set of lateral yarns extending in a substantially weft direction across the fabric between the first set of elongation yarns such that the elongation yarns of the first set of elongation yarns are interwoven with one another by the first set of lateral yarns;
   (ii) a second layer comprising a second set of elongation yarns extending in the substantially warp direction and a second set of lateral yarns extending in the substantially weft direction across the fabric between the second set of elongation yarns such that the elongation yarns of the second set of elongation yarns are interwoven with one another; and
   (iii) a plurality of binder yarns, at least one of which is interwoven between the first layer and the second layer at various points along a length of the fabric to secure the first layer with the second layer,
      wherein at least one of the plurality of binder yarns interweaves groups of two or more lateral yarns of the first set of lateral yarns in the first layer with groups of two or more lateral yarns of the second set of lateral yarns in the second layer, wherein the at least one of the plurality of binder yarns exits the first layer and reenters the first layer along a plurality of first bands such that each of the first bands includes one of the groups of two or more lateral yarns of the first set of lateral yarns and such that no lateral yarns are present in the first layer between consecutive first bands of the plurality of first bands, wherein the at least one of the plurality of binder yarns exits the second layer and reenters the second layer along a plurality of second bands such that each of the second bands includes one of the groups of two or more lateral yarns of the second set of lateral yarns and such that no lateral yarns are present in the second layer between consecutive second bands of the plurality of second bands, wherein the elongation yarns have a shrinkage characteristic that is greater than a shrinkage characteristic of the binder yarns and wherein the binder yarns have a tensile strength that is greater than a tensile strength of the elongation yarns, and wherein the binder yarns are longer than the elongation yarns.

11. The fabric of claim 10, wherein, after the fabric is heat treated, a length of the fabric is capable of elongating when subjected to a load by up to approximately 100%.

12. The fabric of claim 10, wherein a distance between the consecutive first bands and a distance between the consecutive second bands are each configured to shrink in length by at least approximately 40% when the fabric is heat treated.

13. The fabric of claim 10, wherein, along the first and second bands, the plurality of binder yarns surround the elongation yarns of the first and second sets of elongation yarns and help protect the elongation yarns.

14. The fabric of claim 10, wherein the fabric is generally flat.

15. The fabric of claim 10, further comprising at least a third layer of elongation yarns that extend in the substantially warp direction and that are interwoven with one another by a third set of lateral yarns.

16. The fabric of claim 10, wherein each of the plurality of first bands extends across a width of the first layer and each of the plurality of second bands extends across a width of the second layer.

17. The fabric of claim 10, wherein a selected one of the plurality of second bands is between the consecutive first bands and wherein a selected one of the plurality of first bands is between the consecutive second bands of the second layer.

18. A method of weaving a fabric comprising:
(i) interweaving a first set of elongation yarns with one another by a first set of lateral yarns in a substantially warp direction to form a first layer of the fabric, wherein the first set of lateral yarns extends in a substantially weft direction across the first layer between the first set of elongation yarns;
(ii) interweaving a second set of elongation yarns with one another by a second set of lateral yarns in the substantially warp direction to form a second layer of the fabric, wherein the second set of lateral yarns extends in the substantially weft direction across the second layer between the second set of elongation yarns; and
(iii) interweaving at least one binder yarn between the first layer and the second layer along a length of the fabric to secure the first layer with the second layer such that:
the at least one binder yarn exits the first layer and reenters the first layer along a plurality of first sections, where each of the first sections includes a group of two or more lateral yarns of the first set of lateral yarns such that no lateral yarns are present in the first layer between consecutive first sections of the plurality of first sections of the first layer, and
the at least one binder yarn exits the second layer and reenters the second layer along a plurality of second sections, where each of the second sections includes a group of two or more lateral yarns of the second set of lateral yarns such that no lateral yarns are present in the second layer between consecutive second sections of the plurality of second sections of the second layer.

19. The method of claim 18, further comprising heat treating the fabric such that a distance between the consecutive first sections along the first layer shrinks in length by at least approximately 40%.

20. The method of claim 19, further comprising heat treating the fabric such that a distance between the consecutive second sections along the second layer shrinks in length by at least approximately 40%.

* * * * *